INVENTORS A. ASHKIN
B. TELL

United States Patent Office 3,517,333
Patented June 23, 1970

3,517,333
COHERENT OPTICAL DEVICES EMPLOY-
ING INDUCED INHOMOGENEITIES IN
NONFERROELECTRIC CRYSTALS
Arthur Ashkin, Bernardsville, and Benjamin Tell, Scotch Plains, N.J., assignors to Bell Telephone Laboratories, Incorporated, Murray Hill and Berkeley Heights, N.J., a corporation of New York
Filed June 16, 1967, Ser. No. 646,676
Int. Cl. H01s 3/00
U.S. Cl. 331—94.5
5 Claims

ABSTRACT OF THE DISCLOSURE

Laser pulse generators, power limiters and optically pumped lasers can be made by employing a saturation absorption produced by strong monochromatic light in a crystal, such as cadmium sulfide, having an absorption band near the light frequency. In the pulse generator, a saturable absorption of the material interacts with the inhomogeneous saturation of the laser active medium to phase-lock the oscillating modes to form the pulses from a plurality of modes that start to oscillate. In the power limiter, a diverging lens is produced by a change in index of refraction that is related to a change in the absorption due to the optically induced variation of the density of absorbing impurities across the cross section of the beam. In the optically pumped laser, the cadmium sulfide crystal is the active medium. In cadmium sulfide, the absorption is believed to be produced primarily by compensated acceptor vacancies in the material.

BACKGROUND OF THE INVENTION

This invention relates to coherent wave optical devices, such as laser pulse generators, power limiters, optically pumped lasers and lenses employing induced inhomogeneities in nonferroelectric crystals.

Optical inhomogeneities produced by laser light have been heretofore observed in ferroelectric crystals such as lithium niobate and lithium tantalate and have been considered to be detrimental in most optical devices based on these crystals.

One problem presented by the power-dependent inhomogeneity in a ferroelectric crystal is its optical distortion. Let us consider, for example, the inhomogeneities in the index of refraction of lithium niobate. They are highly asymmetrical and exhibit sharp irregularities giving rise to considerable scattering. Moreover, the induced index inhomogeneity in lithium niobate can be considered as the sum of two parts—an integrating component and a non-integrating component. The integrating component in lithium niobate builds up gradually to a level that depends only on the integrated power and remains essentially indefinitely when the light is removed. This component is probably due to a charge-trapping phenomenon. The trapping of photoionized charges in the region around the path of the laser light could produce large enough fields and strains to account for the index changes observed. The nonintegrating component, on the other hand, is present only when the laser light is on and disappears almost instantly when the light is removed.

We have recognized that useful application could be made of either effect if it could be produced substantially independently of the other effect and if the distortions could be controlled or eliminated.

BRIEF SUMMARY OF THE INVENTION

We have discovered strong optical absorption and index inhomogeneities of the nonintegrating type, substantially independent of the integrating type, in crystals pumped essentially monochromatically near an absorption band provided by a relatively limited number of absorbing impurities. The relevant absorption band in cadmium sulfide is the result of impurity levels in the energy band gap. The energy band gap is the energy difference between the highest full band (the valence band) and the lowest empty band ( the conduction band).

We have observed these crystals to be of good optical quality.

By "a relatively limited number of absorbing impurities" we mean a number of absorbing impurities such that some saturation can be produced at reasonable light power levels.

We have observed absorption that varies inversely with laser power up to a level at which absorption saturation begins to occur. We have observed reductions in index of refraction that produce the effect of a diverging lens and that are directly related to absorption until the onset of saturation starts to weaken the process. Upon absorption saturation, the lens effect disappears.

The change in refractive index is apparently related to a change in absorption due to the optically induced variation of the fraction of impurities capable of producing absorption across the cross section of the laser beam. The depleting of the absorbing impurities tends to slow the propagation of the light and turn it outward toward the regions where greater numbers of them can still produce absorption. In cadminum sulfide, these impurities are thought to be cadmium acceptor vacancies and various shallow donors which tend to compensate the cadmium acceptor vacancies. An induced diverging lens with an equivalent focal length the order of a few millimeters has been obtained in a crystal substantially compensated with cadmium acceptor vacancies.

In cadmium sulfide, we have observed recombination radiation of energy slightly less than the band gap energy, or wavelength slightly longer than the band gap wavelength, to occur with an efficiency of about fifty percent (50%). This recombination radiation is called the green-edge emission. The recombination occurs between electrons and cadmium acceptor vacancies.

Highly efficient recombination radiation should be observable in cadmium selenide, zinc selenide, zinc oxide, zinc sulfide, and mixed crystals such as cadmium sulfide selenide at different wavelengths slightly longer than their band gap wavelengths under suitable doping. Edge emission is observed in these crystals.

According to one feature of our invention, a laser pulse generator of the type including an inhomogeneously saturating, continuously pumped active medium and a saturable attenuating element having an initial attenuation permitting a plurality of axial modes to start to oscillate is particularly characterized in that the saturable attenuating element comprises a nonferroelectric crystal that has an absorption band including a wavelength approximately equal to a laser wavelength of the active medium and provides an absorption varying inversely with the power of the laser light up to a saturation level.

According to another feature of our invention, power limitation of laser light can be obtained with a much more rapid rate of response than in prior proposals by employing an optically induced diverging lens comprising a crystal of a nonferroelectric material having an absorption band wavelength near the wavelength of the laser light. In one version of such a power limiter, the induced lens is followed by a mask having a central aperture of a size adapted to pass only a central, power-limited portion of the laser light. In another embodiment of a power limiter, the induced lens is followed by an abnormally small end reflector that forms part of the laser resonator. The power-limited central portion of the laser beam is separated from the remainder of the diverging laser beam by adapting that end reflector to reflect only the power-limited portion of the beam.

According to still another feature of our invention, an optically pumped broadband laser is provided by employing an active medium of a nonferroelectric crystal capable of producing recombination radiation in a band of wavelengths longer than and separated from an absorption band wavelength and by pumping this active medium with laser light at one or more wavelengths near the absorption band wavelengths of the crystal. The resonator of this broadband laser is illustratively oriented to have its axis orthogonal to the axis of the pumping laser. Although this laser has a relatively high threshold for the onset of stimulated emission, as opposed to spontaneous emission, it has the merits of being tunable over a relatively broad band of wavelengths by changing or continuously varying the reflectivity characteristics of its resonator. Even if a fairly narrow wavelength band out of the broad band is thus permitted to oscillate, the relatively high efficiency characteristics of the recombination radiation is retained because of the capability of the active medium to channel all of the available power into emission in the selected wavelength range. Such a laser will have high gain.

BRIEF DESCRIPTION OF THE DRAWING

Other features and advantages of our invention will become apparent from the following detailed description taken together with the drawing, in which.

DETAILED DESCRIPTION OF ILLUSTRATIVE EMBODIMENTS

Figure 1:
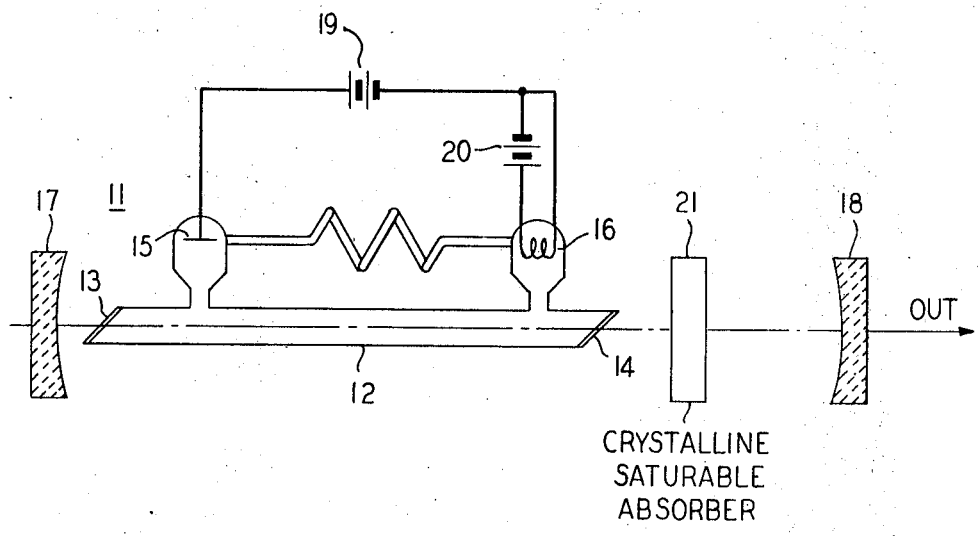
FIG. 1 is a partially pictorial and partially schematic illustration of an illustrative pulse generator embodiment of the invention.

In the pulse generator of FIG. 1, the argon ion laser 11 is adapted for the generation of a continuous train of pulses by the insertion of the crystalline saturable absorber 21.

The argon ion laser 11 includes the tube 12 enclosing the active medium of argon gas that is ionized by the continuous pumping apparatus including the cathode 16, the anode 15, the battery 19 connected in appropriate polarity between the anode and cathode, and the battery 20 connected across the cathode 16 to provide cathode-heating current. The tube 12 is provided with Brewster-angle end windows 13 and 14 and an elongated spiral tube between the cathode and anode to facilitate the continuous circulation of the gases past the anode and cathode in response to the typical ion drift present in such lasers. The argon ion laser 11 further includes the optical resonator formed of reflectors 17 and 18 opposed along a common axis extending through the windows 13 and 14. The reflector 18 is partially transmissive to enable the abstraction of the output radiation pulses. For purposes of the present invention, it should be noted that the laser 11 is of the type known as an inhomogeneously saturating laser and could be replaced by any other inhomogeneously saturating laser that provides an appropriate output wavelength, that is, a wavelength near the band gap wavelength of the crystalline saturable absorber 21.

"Inhomogeneously saturating," as used herein in reference to the laser, means that saturating the gain at one axial mode frequency does not saturate the gain at another axial mode frequency differing from the first frequency by more than a "hole width." A "hole width" is a frequency range corresponding to a velocity class of excited atoms from which a given axial mode can draw energy. Most gas lasers, for example, are inhomogeneously saturating. The general cooperation of lasers of this type with saturable absorbers to produce trains of output pulses of coherent radiation is described in detail in the copending patent application of W. W. Rigrod, Ser. No. 487,974, filed Sept. 17, 1965, and assigned to the assignee hereof.

The crystalline saturable absorber 21 comprises a cadmium sulfide crystal, cooled to liquid nitrogen or liquid hydrogen temperature by means of a cold finger (not shown). The crystalline absorber 21 is preferably nearly compensated with cadmium acceptor vacancies and is otherwise a high resistivity crystal having not more than $10^{15}$ to $10^{17}$ shallow donors per cubic centimeter. A sample approximately 0.1 centimeter thick in the transmission direction is prepared by annealing in a vacuum for several hours at 600 to 700 degrees centigrade. The annealing enhances the production of cadmium acceptor vacancies and further reduces the conductivity of the high resistivity crytsal 21. Cadmium vacancies can, of course, be introduced without annealing. The crystalline absorber 21 is further characterized by a shift of its optical absorption edge to longer wavelengths than that of a nominally pure crystal.

In operation, the laser 11 is adapted to produce laser light at 5145 Angstrom units and 4965 Angstrom units (argon II lines). Optionally, the laser light may be focused to achieve this power density. Initially, an appreciable portion of the laser light will be absorbed in crystal 21, although a sufficient amount is transmitted therethrough such that a plurality of axial modes start to oscillate.

The medium provides a feedback mechanism which favors the production of short high-power phase-locked pulses spaced in time at $2Lc$ as follows: any random arrangement of phases which produce a momentary power increase (or pulse) results in a decrease in loss in absorber 21 and an increase in output power. This phase arrangement maintains itself if the crystal time constant allows significant recovery of its lossy state in the time between pulses. The pulse spacing equals the pulse transit time, $2Lc$, where $c$ is the velocity of light and $L$ is the spacing of the reflectors 17 and 18 in crystal units, all divided by $n$, the number of axial modes that were permitted to start to oscillate.

In order for conditions to be prepared for the generation for the next pulse, it is sufficient that crystal 21 recover a small increment of its absorbing capability. We have observed such recovery to occur in a cadmium sulfide crystal like crystal 21 in a few nanoseconds (one nanosecond is $1 \times 10^{-9}$ seconds). The next succeeding pulse is still a sharp pulse having the same maximum amplitude as the first pulse, provided that the incremental variation of absorption provided by crystal 21 is sufficient to provide phase-locking of the plurality of modes. The required incremental variation can be as low as one percent or less attenuation of the radiation per pass.

The pulse rise and decay times provided by the operation of the embodiment of FIG. 1 are much shorter than the corresponding rise times and decay times that are possible with the pulse generators disclosed in the above-cited copending patent application of W. W. Rigrod. The pulses are not only much more sharply defined, but can also be interleaved by various beam splitting and recombining arrangements to provide a train of pulses with a much more rapid repetition rate than would be possible with the Rigrod pulse generator.

Figure 2:
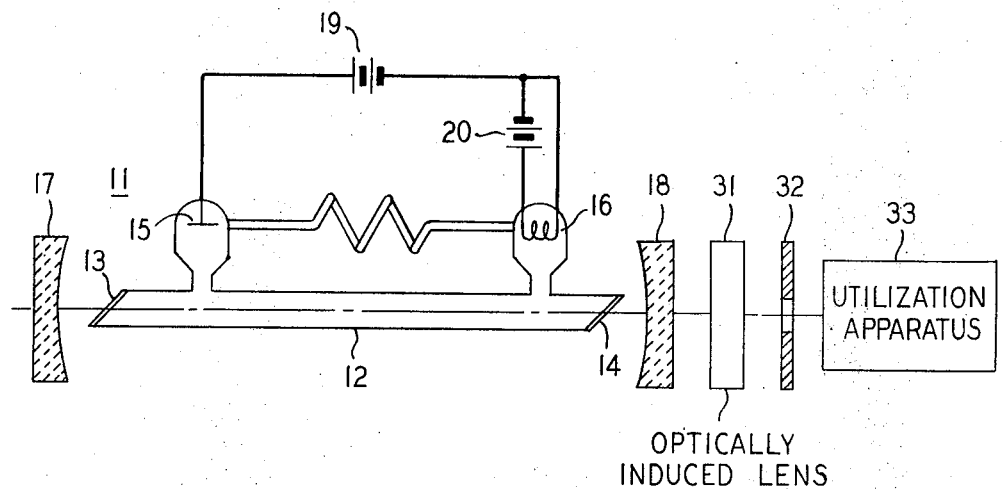
FIG. 2 is a partial pictorial and partially block diagrammatic illustration of a first power-limiting embodiment of the invention.

In the embodiment of FIG. 2, the power output from a laser 11 is limited by an apparatus including the optically induced diverging lens 31 and the mask 32 which has a central aperture of a size adapted to pass only a central power-limited portion of the diverging laser light. The power-limited laser light is then utilized by utilization apparatus 33, which typically is something that would be undesirably sensitive to fluctuations in the laser power.

The laser 11 can be substantially identical to the laser 11 of FIG. 1 except that it is operated without a saturable absorber in the resonator.

The optically induced diverging lens 31 is illustratively a cadmium sulfide crystal that is similar to crystalline absorber 21 of FIG. 1. In this case, however, it is outside the optical resonator and is thus operated at much lower power levels so that absorption saturation is not reached.

The mask 32 has an aperture of diameter approximately half the diameter of the beam that is incident on the crystal 31. It has been shown in the copending patent application of T. C. Damen et al. Ser. No. 525,216, filed Feb. 4, 1966, and assigned to the assignee hereof, that this ratio of aperture diameter to beam diameter will provide effective limiting whenever the characteristic of the preceding optically induced diverging lens has an essentially Gaussian variation in refractive index radially from the center line of the beam passing through it. The lens in that case was produced by thermal effects. We have discovered that the induced lens 31 produces a very pronounced Gaussian variation of index of refraction radially from the center line of the laser beam passing through it. In particular, we observed a change of refractive index as large as one part in $10^3$, which yielded an effective focal length of a few millimeters in a sample approximately a millimeter thick.

The response of the power-limiting arrangement shown in FIG. 2 is many orders of magnitude faster than the response of the thermal lens power limiter of the above-cited copending patent application of T. C. Damen et al. Induced lens 31 will provide response times of the order of a few microseconds; whereas the thermally induced lens of the Damen et al. power limiter provides a response time of the order of seconds.

Figure 3:
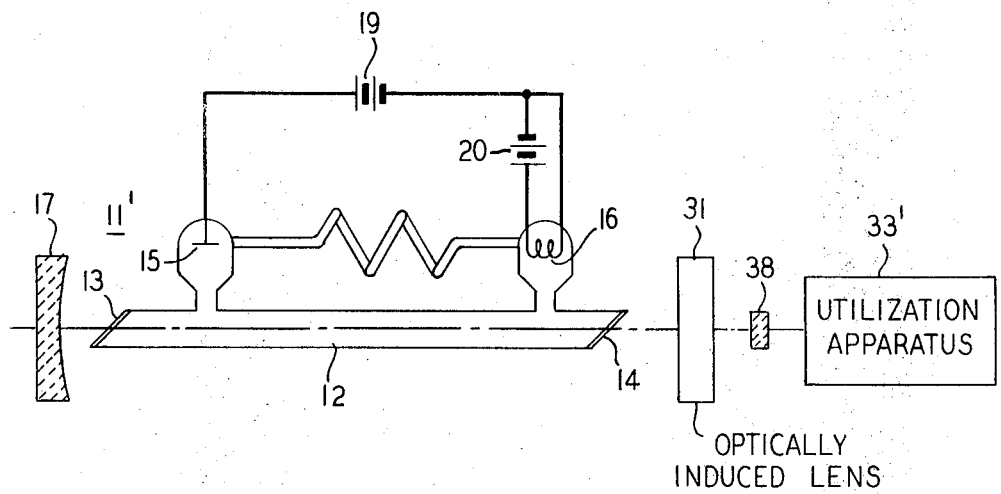
FIG. 3 is a partially pictorial and partially block diagrammatic illustration of another power-limiting embodiment of the invention.

In view of the very strong lens effects obtained from such nonferroelectric crystals, a simplified alternative arrangement of a power limiter for relatively low power gas lasers is feasible. This arrangement is shown in FIG 3.

The resonator of laser 11 consists of the reflector 17 and the relatively small, partially transmissive reflector 38. Components numbered the same as in FIG. 2 are identical to those components.

The reflector 38, illustratively a planar reflector, has a diameter transverse to the laser axis which is less than the diameter of the beam incident on crystal 31. The reflector 17 tends to focus the laser light toward the surface of reflector 38 so that, but for the action of crystal 31, substantially all of the laser beam would be intercepted by reflector 38. As the power level of the light within laser 11' starts to rise, crystal 31 causes portions of it to diverge through a greater angle and thus miss the edges of reflector 38. Utilization apparatus 33' is adapted to receive only light transmitted through the partially transmissive reflector 38 and to block light which is passed around the edges of reflector 38. This function can be achieved by a mask similar to mask 32 of FIG. 2 but with an aperture of diameter equal to the diameter of reflector 38 and aligned therewith. Alternatively, the useful output may be extracted through reflector 17, provided reflector 17 is made partially transmissive.

In any event, random increases in power level are directed out of the resonator by induced lens 31. On the other hand, if the power level should fall, the lens effect produced by induced lens 31 decreases so that more light is retained in the resonator, thereby preserving substantially the same power level as before. The variations in power level needed to produce the described changes in the diverging lens effect are several orders of magnitude smaller than the fluctuations in power level that would occur in the absence of induced lens 31.

Figure 4:
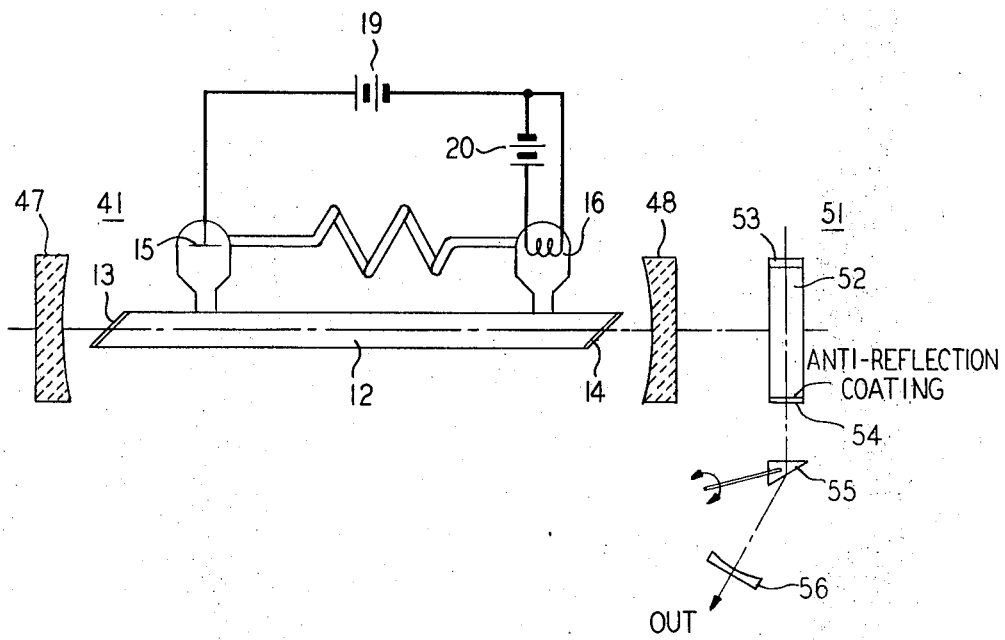
FIG. 4 is a partially pictorial and partially schematic illustration of another embodiment of the invention that provides an optically pumped broadband laser.

In the embodiment of FIG. 4, the laser 41 is similar to the lasers 11 in FIG. 1 and FIG. 2 with the exception that the reflectors 47 and 48 are coated to permit the 4880 Angstrom unit line of the argon ion laser to oscillate in addition to the 5145 Angstrom unit and 4965 Angstrom unit lines. Reflector 48 is partially transmissive to permit a portion of the light to be transmitted into the crystalline laser 51 as pumping light.

The crystalline laser 51 includes the crystal 52 of cadmium sulfide compensated with cadmium acceptor vacancies. Reflective coating 53 is then deposited on the crystal 52 in a plane parallel to the axis of laser 41 but normal to the intended axis of laser 51. Reflector 53 is made reflective to the entire band of wavelengths between about 5100 Angstrom units to 5600 Angstrom units, the wavelength range of the green-edge emission; and the other end of crystal 52 is anti-reflection coated.

In order to tune the output of the laser 51 over the broad wavelength range at which it is capable of lasing, the resonator includes, in addition to reflective coating 53, the rotatable triangular prism 55 and the focusing opaque end reflector 56. The position of prism 55 determines a narrow band of wavelengths that are propagated with relatively low loss along the axis of the resonator.

We have observed recombination radiation of an efficiency of about fifty percent (50%) from crystals such as crystal 52, of the order of one millimeter thick in the pumping light propagation direction and cooled below 77 degrees Kelvin, and having a cadmium acceptor vacancy concentration of about $10^{15}$ to $10^{17}$ per cubic centimeter. Our studies indicate that this green-edge emission should become stimulated at the power levels presently obtainable from argon ion lasers such as laser 41, provided the crystal 52 has been provided with a sufficient number of cadmium acceptor vacancies and is otherwise of sufficiently good optical quality.

In the tunable embodiment of FIG. 4, nearly all of the available power will be emitted within a relatively narrow band of wavelengths within the green-edge spectrum.

Similar edge emissions can be obtained from other crystals such as cadmium selenide (near 7000 Angstrom units), zinc oxide (near 3900 Angstrom units), and zinc sufide (near 3200 Angstrom units), as well as others mentioned above in the brief summary of the invention.

Our findings lead us to believe that the introduction of carrier trapping centers in nonferroelectric crystals will produce integrating inhomogeneities of good optical quality. Such crystals would be useful for short-term memory.

What is claimed is:
1. A laser comprising
   an active medium including argon capable of producing coherent radiation in a first wavelength range,
   means for supplying pumping energy to said active medium to ionize the argon gas and enable said radiation, whereby the lasing action in the first wavelength range is produced by transitions among energy levels of argon ions,
   means associated with said active medium for resonating said radiation, and
   a body of crystalline material disposed in the path of said radiation, said body comprising a crystal of cadmium sulfide including substantial numbers of compensated cadmium acceptor vacancies providing an absorption band including a wavelength near said first wavelength range and an absorption of said radiation that varies in an inverse relation with the intensity of said radiation.
2. A laser pulse generator of the type comprising
   an inhomogeneously saturating laser medium,
   means for continuously pumping said medium, and
   an optical resonator including a saturable attenuating element that provides an initial attenuation permitting a plurality of axial modes to start to oscillate,
   said generator being characterized in that said saturable attenuating element comprises a crystal of cad- mium sulfide including substantial numbers of compensated cadmium acceptor vacancies contributing an energy level nearer the valence band than the conduction band in the band gap of said crystal and in that said active medium provides at least one lasing transition of energy difference approximately equal to the band gap of said crystal.

3. A laser providing power-limited transmission of coherent light, comprising an active medium capable of producing coherent radiation in a first wavelength range, means for supplying pumping energy to said active medium to enable said radiation, means encompassing said active medium for resonating said radiation and abstracting a portion thereof as an output, a body of nonferroelectric crystalline material disposed in the path of said radiation and characterized by an inhomogeneity in the index of refraction of said material in response to radiation in said first wavelength range, said inhomogeneity producing the effect upon said radiation of a diverging lens having a focal length inversely related to the power of the portion of said radiation that passes through said body, and means disposed on the side of said body opposite said active medium for separating a central power-limited portion of said beam from the remainder of said beam.

4. A laser according to claim 3 in which
the nonferroelectric crystal comprises a crystal of cadmium sulfide including substantial numbers of compensated cadmium acceptor vacancies providing said inhomogeneity in the index of refraction, and the separating means comprises an opaque mask having a central aperture therein of size appropriate for transmitting the power-limited portion of said radiation.

5. A laser according to claim 3 in which
the nonferroelectric crystal comprises a crystal of cadmium sulfide including substantial numbers of compensated cadmium acceptor vacancies providing said inhomogeneity in the index of refraction, the resonating means comprises a pair of reflectors having a common axis along the path of the radiation, and the separating means comprises adaptation of one of the reflectors to have an effective lateral extent confined to the power-limited portion of said radiation.

References Cited
UNITED STATES PATENTS

| | | | |
|---|---|---|---|
| 3,270,291 | 8/1966 | Kosonocky | 331—94.5 |
| 3,369,192 | 2/1968 | Koester | 331—94.5 |
| 3,434,779 | 3/1969 | Damen et al. | 331—94.5 |
| 3,439,169 | 4/1969 | Lynch | 331—94.5 |

RONALD L. WIBERT, Primary Examiner

C. CLARK, Assistant Examiner